United States Patent
Heijnen

(10) Patent No.: US 6,495,043 B1
(45) Date of Patent: Dec. 17, 2002

(54) MEMBRANE WHICH COMPRISES A BLEND OF A POLYSULPHONE OR A POLYETHER SULPHONE AND POLYETHYLENE OXIDE/POLYPROPYLENE OXIDE SUBSTITUTED ETHYLENE DIAMINE

(75) Inventor: Martin Leonard Heijnen, Camberley (GB)

(73) Assignee: Kalsep Limited, Surrey (GB)

( * ) Notice: Subject to any disclaimer, the term of this patent is extended or adjusted under 35 U.S.C. 154(b) by 58 days.

(21) Appl. No.: 09/694,841

(22) Filed: Oct. 23, 2000

Related U.S. Application Data

(63) Continuation of application No. PCT/GB99/01069, filed on Apr. 23, 1999.

(30) Foreign Application Priority Data

Apr. 23, 1998 (GB) ............................................. 9808689

(51) Int. Cl.[7] .......................... B01D 71/68; B01D 71/56
(52) U.S. Cl. .......................... 210/500.41; 210/500.38; 210/500.37; 210/500.27; 210/500.36; 264/41; 264/48; 264/49
(58) Field of Search ............... 210/500.41, 500.37, 210/500.38, 500.36, 500.27; 264/41, 48, 49

(56) References Cited

U.S. PATENT DOCUMENTS 6,071,406 A * 6/2000 Tsou
6,177,181 B1 * 1/2001 Hamada et al.
6,280,853 B1 * 8/2001 Mickols

FOREIGN PATENT DOCUMENTS

| CA | 1294745 | 7/1985 |
| EP | 0168783 | 1/1986 |
| JP | 62-201603 | * 9/1987 |
| JP | 2-160026 | * 6/1990 |
| WO | 9627429 | 9/1996 |

OTHER PUBLICATIONS

English language abstract of EP 168783.

* cited by examiner

Primary Examiner—Ana Fortuna
(74) Attorney, Agent, or Firm—Baker Botts L.L.P.

(57) ABSTRACT

A membrane which can be used in membrane filtration processes and which has a reduced tendency to fouling is a polysulphone or a plyether sulphone and a polyethylene oxide/polypropylene oxide substituted diamine and can be made by a phase inversion process in the presence of pore modifying agents such as an alcohol, glycerol or glycol to give a membrane which has a pore size of $0.1\mu$ to 1 micron and is hydrophilic.

25 Claims, 2 Drawing Sheets

Figure 1:
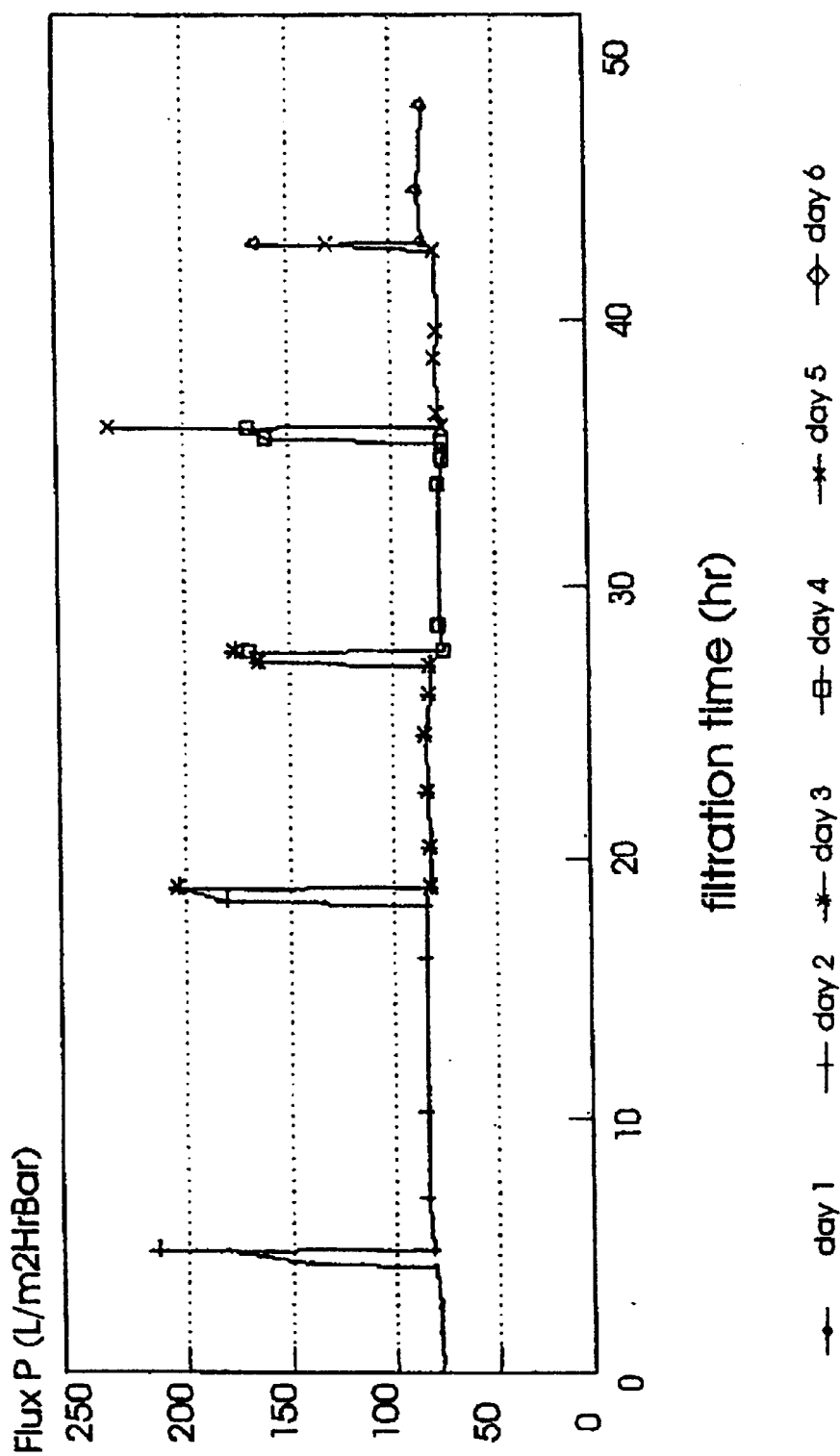

MEMBRANE WHICH COMPRISES A BLEND OF A POLYSULPHONE OR A POLYETHER SULPHONE AND POLYETHYLENE OXIDE/POLYPROPYLENE OXIDE SUBSTITUTED ETHYLENE DIAMINE

CROSS-REFERENCE TO RELATED APPLICATIONS

This application is a continuation of International Application No. PCT/GB99/01069, filed on Apr. 23, 1999 which is incorporated by reference herein and which published in English on Nov. 4, 1999, which in turn claims priority from Application No. GB 9808689.5, which was filed on Apr. 23, 1998.

This application is a continuation of PCT/GB99/01069, filed Apr. 23, 1999 which is incorporated by reference herein.

BACKGROUND OF THE INVENTION

The present invention relates to a membrane which can be used in membrane filtration processes including microfiltration ultrafiltration and reverse osmosis and which has a reduced tendency to fouling.

Membranes are used in separation techniques such as filtration, micro-filtration, reverse osmosis etc. and for the recovery of solids. The membranes can be made of polymeric material and a particular class of polymers are the polysulphones, including polyether sulphones.

Polysulphones have been widely used because of their chemical resistance and good physical properties. "Polysulphone" is used as a generic name for a type of high molecular weight polymer containing aromatic nuclei and sulphone groups in the main chain.

A typical sulphone is formed as the condensation product of bisphenol 'A' and dichloro-diphenyl-sulphone. Also widely used are polyether sulphones, polyphenyl sulphones and polyarylether sulphones. However polysulphones have a surface which is hydrophobic and, in use polysulphone membranes are subject to fouling, particularly when being used to filter liquids containing organic components such as proteinaceous material. This fouling results in the build up of a layer on the surface of the membrane which blocks the pores of the membrane and causes deterioration in its performance.

It is known to treat the surface of hydrophobic membranes to form a more hydrophilic surface and a method is disclosed in U.S. Pat. No. 4.618,553. Another method of treating a membrane to make it more hydrophilic is disclosed in International PCT Application WO 90/14149.

However, previously disclosed methods of modifying hydrophobic membranes to produce a more hydrophilic surface can be relatively complex and costly and are limited in their effectiveness.

EP Patent 0407665A1 discloses a polyether sulphone membrane made from polyether sulphone and other polymeric components and a method of making such blends by dissolving the polymer components in n-methylpyrrolidone (NMP), dimethylformamide (DMF) or dimethylacetamide and co-precipitating the polymer blend by a phase inversion process using water.

Patent Application WO 96/27429 discloses a membrane which comprises a blend of a polysulphone or polyether sulphone and an ethylene oxide/propylene oxide copolymer.

SUMMARY OF THE INVENTION

We have now devised polysulphone/polyether sulphone blended membranes with improved properties and a method of making such membranes.

According to the invention there is provided a membrane which comprises a blend of (a) a polysulphone or a polyether sulphone, and (b) a diamine substituted with moieties comprising polyethylene oxide groups, moieties comprising polypropylene oxide groups, or moieties comprising polyethylene oxide groups and polypropylene oxide groups, wherein the diamine has the formula

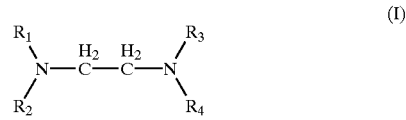

where $R_1$, $R_2$, $R_3$ and $R_4$ are the same or different moieties of formula

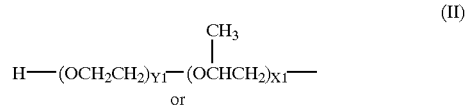

or

where X, X1, Y and Y1 can be the same or different in each of $R_1$, $R_2$, $R_3$ and $R_4$.

DETAILED DESCRIPTION OF THE PREFERRED EMBODIMENTS

Preferably the compound (I) has a weight average molecular weight of 400 to 100,000 and more preferably from 1.650 to 50.000 and X, Y, X1, Y1 are chosen accordingly.

The compounds of formula (I) can be made by sequential addition of propylene oxide and ethylene oxide to ethylene diamine. Compounds (I) are sold under the Registered Trade Mark "Tetronics" by BASF or as "Poloxamers" or "Superonics" by ICI and are commercially available.

The preferred compounds (I) are those in which $R_1$, $R_2$, $R_3$ and $R_4$ are of formula (II) i.e. the terminal groups are polyoxyethylene.

The polysulphone can be any polysulphone which can be produced in the form of a film, membrane, hollow fibre or other configuration which is conventionally used and preferred polysulphones are standard polysulphones and polyether sulphones.

Polysulphones are described in U.S. Pat. No. 4.230.463. Polysulphones having aromatic hydrocarbyl-containing moieties generally have good thermal stability. Polysulphones and polyether sulphones suitable for making membranes have molecular weights in the range 20.000 to 80.000 and are sold under the trade names UDEL, P-1700 and P-3500 by Amoco. ASTREL 360 Plastic by the 3M Company and as Ultrasons such as Polysulphone Ultrason S and Polysulphone Ultrason E. by BASF.

The molar ratio of polysulphone to polyethylene oxide/polypropylene oxide substituted diamine in the dope is preferably from 25:1 to 1:40 and more preferably from 8:1 to 1:30.

The membranes of the present invention preferably have a structure such that the ethylene oxide/propylene oxide copolymer substituted diamine molecules are concentrated towards the surface of the membrane, so that the more hydrophilic copolymer molecules cause the surface of the material to be rendered more hydrophilic with little or no loss in the performance of the membrane.

One part of the ethylene oxide/propylene oxide copolymer molecule can have a greater affinity with the dissolved polysulphone polymer and one part (the more hydrophilic part) can have a greater affinity to the non solvent phase. By a variation of the ethylene oxide/propylene oxide copolymer substituted diamine the properties of the final composition can be varied.

The ethylene oxide/propylene oxide copolymer chains preferably have a ratio of ethylene oxide to propylene oxide groups such that the copolymer is substantially water soluble whilst being compatible with the polysulphone in solvent solution.

The molar ratio of ethylene oxide to propylene oxide groups in the ethylene oxide/propylene oxide copolymer side chains is preferably from 1:10 to 10:1.

The blends can be prepared by dissolving both polymer components in a solvent and co-precipitating the blend by a phase inversion process. The solvent for the polymers should be one which is inert to the polymers and will dissolve both polymers for example n-methylpyrrolidone, dimethylformamide, dimethylacetamide and similar compounds.

The membranes of the present invention preferably have a pore size with a molecular weight cut off of greater than 500 and preferably the membranes of the present invention have a pore size with a molecular weight cut off of greater than 1.000 and with a pore size up to 1 micron ($1\mu$).

We have surprisingly found that the addition of pore modifying agents to the solution of the polymers can produce membranes with an increased pore size. The pore modifying agents which can be used are non-solvents such as water, alcohols such as n-butanol, polyethylene glycols (PEG), glycerols, and polyvinylpyrrolidones (PVP).

The polyethylene glycol is preferably present in an amount up to 80% of the polymer solution, the PVP up to 50%, the butanol up to 20%, the glycerols up to 20% and the water up to 15%

It is very surprising that the addition of these compounds to the solution of the polymers does not render the solution unstable and causing an increase in the pore size. This is particularly true in the case of polymers such as PVP and PEG. It has also been found that the use of such additives can give rise to a membrane with a more open pore structure which is referred to as a tortuous pore structure.

The process which is used to precipitate the polymer blend from the solution is precipitation by the phase inversion process from the solution of the components (polymer blend solution) using a precipitation liquid.

Preferably the ethylene oxide/propylene oxide copolymer is enriched at the surface of the membrane linking in the phase inversion process, because of the migration of the water soluble component to the colloidal interface.

It is thought that the ethylene oxide/propylene oxide copolymer and polysulphone are co-precipitated from the solvent and, because of the more hydrophilic nature of the ethylene oxide chain the copolymer migrates to the solvent/ precipitation liquid interface thus enriching the surface of the membrane formed. It is thought that the ethylene oxide/ propylene oxide copolymer molecules align themselves with their hydrophilic component aligned towards the precipitation liquid and the non-hydrophilic part aligned towards the hydrophobic polysulphone polymer matrix enriching the surface of the membrane to make it more hydrophilic.

The incorporation of the ethylene oxide/propylene oxide copolymer substituted diamine within the polysulphone polymer matrix is indicated by the fact that the ethylene oxide/propylene oxide copolymer substituted diamine cannot be removed by repeated washing.

In EP 04076651A1 water is disclosed as the precipitation liquid, but we have surprisingly found that, if certain agents are added to the precipitation liquid membranes are produced with a larger pore size. The pore enlarging agents which can be used are low molecular weight alcohols such as methanol, ethanol, polyethylene glycols, glycerols, solvents such as NMP, DMF, dimethyl acetamide and the like.

The amount of these pore enlarging agents present in the precipitation liquid can be up to 100% (i.e. up to being the sole precipitation liquid) in the case of the alcohols and glycerols and up to 90% in the case of polyethylene glycols and up to 80% in the case of the solvents.

Optionally, after the formation of the composition comprising the polysulphone and ethylene oxide/propylene oxide copolymer, the copolymer, or other polymeric additive may be cross-linked.

The cross-linking can be carried out using an appropriate cross-linking agent. Cross-linking agents which can be used are sodium hypochlorite, isocyanates dicarboxlic acid halides, chlorinated epoxides such as epichlorohydrin, cross-linking can also be achieved by UV radiation, for example by use of iso-butronitrile and subsequent reaction with a suitable divalent species. The degree of cross-linking can be controlled by the type and concentration of the cross-linking agent, the duration of the treatment and the temperature. The more severe the cross-linking treatment, the higher the molecular weight of the final cross-linked product. After cross-linking, the membrane is preferably washed to remove excess unreacted ethylene oxide/ propylene oxide copolymer. The cross linking virtually eliminates any possibility of the leaching of the copolymer.

The membranes of the invention can be of conventional type e.g. in the form of sheets, tubes, hollow fibres etc.

It is a feature of the membranes of the invention that the hydrophilicity of a polysulphone membrane can be permanently increased with little or no deleterious effect on its performance in filtration. This increased hydrophilicity will reduce the tendency of the membrane to foul.

A further feature of the membranes of the invention is that they have advantages when they are used in microfiltration or ultrafiltration. In microfiltration and ultrafiltration it is important that the membranes are wetted before use i.e. the pores which are filled with air become filled with liquid. With polysulphones this is difficult as they have a low hydrophilicity and in use can involve difficult pre-wetting of the polysulphone membrane with a liquid with a low surface tension e.g. alcohol and trying to ensure that the membrane is completely pre-wetted before it can be used in aqueous filtration. The membranes of the present invention, because of the more hydrophilic nature of the membrane, can be wetted with water and so can be used in ultrafiltration and microfiltration and, in particular microfiltration membranes are wetted instantaneously on contact with water, and after repeated drying.

Normally microfiltration membranes are supplied dry and wetted for use and it is a feature of the invention that it can produce micro-filtration membranes which can be dried and subjected to repeated drying without collapse of the structure.

The micro-filtration membranes of the present invention generally have a pore size of $0.1\mu$ to 1 micron and are hydrophilic.

The process of the present invention can also produce membranes with a "tortuous" structure, this means that the membranes have a sponge like structure rather than a macrovoidal structure and which can enable greater filtration capacity to be obtained. In a tortuous structure there is an interconnecting of polymer strands which form a reticulated open cell matrix and so the membranes have a high void space.

FIG. 1 represents the performance of the membrane of the present invention.

Figure 2:
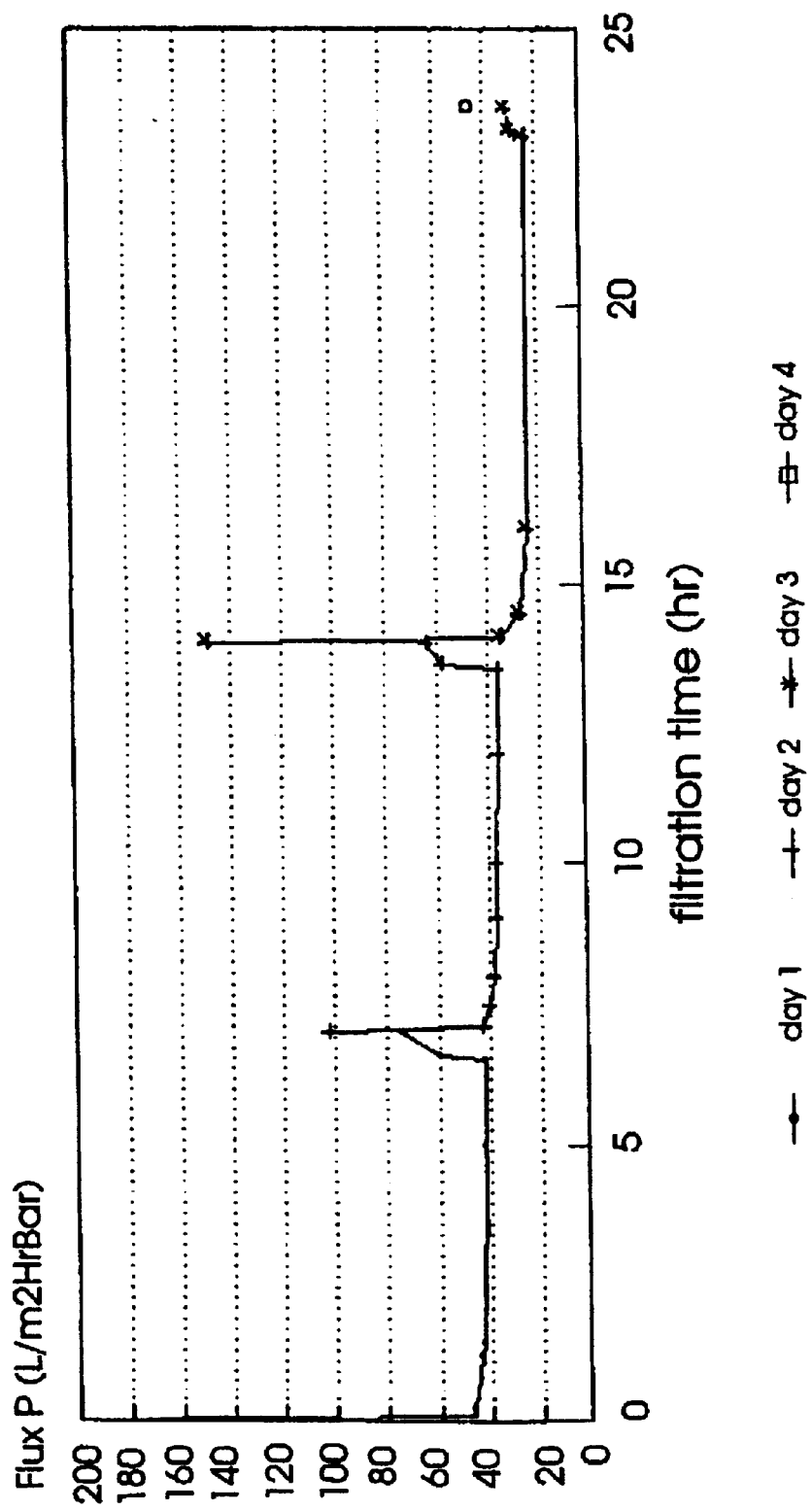

FIG. 2. Represents the performance of a commercially available polyethersulfone membrane.

The Invention will now be described with reference to the following examples in which Example 1 is an example of a membrane prepared by the process of EP 0407 665A1

EXAMPLE 1

A polyether sulphone sold under the Trade Name Ultrason E and an ethylene oxide/propylene oxide copolymer of molecular weight 18,000 (Tetronic 1307) were dissolved in n-methylpyrrolidone (NMP) and stirred until a clear solution was obtained. The solution was formed into a hollow fibre membrane by a spinning process. The weight composition of the solution was 25% polyether sulphone(PES). 20% ethylene oxide/propylene oxide copolymer and 55% n-methylpyrrolidone. The membranes formed were washed in water for two day after formation.

The membrane made according to the Example had a molecular weight cut off of approximately 50,000. It was tested for anti-fouling properties in a milk filtration test in which milk was filtered through the membrane and the clean water flux measured. The membrane was cleaned by washing with clean water at the end of each day and the clean water flux measured.

The results are shown in FIG. 1. The initial clean water flux was 230 $1 \text{ m}^{-2}\text{hr}^{-1}/\text{bar}^{-1}$. After each washing the clean water flux was restored close to its original value. At the end of day four a low level concentration was used to prevent the milk from going off over the weekend and this almost fully restored the flux to its original value to 220 $1 \text{ m}^{-2}\text{hr}^{-1}/\text{bar}^{-1}$. The process flux of 80 $1 \text{ m}^{-2}\text{hr}^{-1}/\text{bar}^{-1}$ was maintained at a consistent level through the test, indicating that virtually no fouling of the membrane had occurred.

The results from FIG. 1 can be compared with the results from a good quality commercially available polyethersulphone membrane, also with a cut off of approximately 50,000 shown in FIG. 2. The commercially available membrane had a higher initial water flux of 500 $1 \text{ m}^{-2}\text{hr}^{-1}/\text{bar}^{-1}$ compared with 230 $1 \text{ m}^{-2}\text{hr}^{-1}/\text{bar}^{-1}$ for the membrane of the Example. However, the initial process flux was much lower at 40 $1 \text{ m}^{-2}\text{hr}^{-1}/\text{bar}^{-1}$ compared with 80 $1 \text{ m}^{-2}\text{hr}^{-1}/\text{bar}^{-1}$ for the membrane of the Example. For the commercially available membrane cleaning with water did not restore the water flux to a satisfactory level and on the subsequent day the process flux declined further. Because of the fouling which had occurred, this membrane was left in dilute sodium hypochlorite solution over the weekend after day two. Although this improved the clean water flux somewhat, it did not restore the flux close to its original value and the subsequent process flux declined further to 22 $1 \text{ m}^{-2}\text{hr}^{-1}/\text{bar}^{-1}$. Washing with water at the end of day three was ineffective at improving the clean water flux, showing that the membrane had become seriously fouled.

I claim:

1. A membrane which comprises a blend of
   (a) one selected from the group consisting of a polysulphone and a polyether sulphone; and
   (b) a diamine substituted with moieties comprising polyethylene oxide groups, moieties comprising polypropylene oxide groups, or moieties comprising polyethylene oxide groups and polypropylene oxide groups, wherein the diamine has the formula

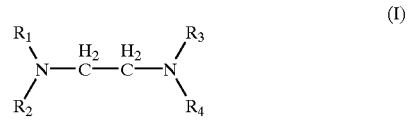

where $R_1$, $R_2$, $R_3$ and $R_4$ are the same or different moieties of formula

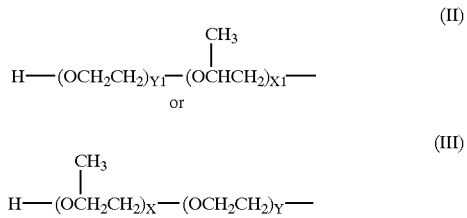

where X, X1, Y and Y1 can be the same or different in each of $R_1$, $R_2$, $R_3$ and $R_4$.

2. A membrane as claimed in claim 1 wherein the compound (I) has a weight average molecular weight of 400 to 100,000.

3. A membrane as claimed in claim 1 wherein the compound (I) has a weight average molecular weight of 1,650 to 50,000.

4. A membrane as claimed in claim 3 wherein the compounds (I) are those in which $R_1$, $R_2$, $R_3$ and $R_4$ are of formula (II).

5. A membrane as claimed in claim 1 wherein the polysulphone has a molecular weight in the range of 20,000 to 80,000.

6. A membrane as claimed in claim 1 wherein the molar ratio of polysulphone to substituted diamine is from 8:1 to 1:30.

7. A membrane as claimed in claim 1 wherein the membrane has a structure such that the substituted diamine molecules are concentrated towards the surface of the membrane.

8. A membrane as claimed in claim 1 wherein the ratio of ethylene oxide to propylene oxide groups is such that the substituted diamine is substantially water soluble and compatible with the polysulphone in solvent solution.

9. A membrane as claimed in claim 8 wherein the molar ratio of ethylene oxide to propylene oxide groups in the substituted diamine is 1:10 to 10:1.

10. A membrane as claimed in claim 1 wherein the membrane has pore size with a molecular weight cut off of greater than 500.

11. A membrane as claimed in claim 1 wherein the membrane has a pore size with a molecular weight cut off greater than 1,000.

12. A membrane as claimed in claim 1 wherein the membrane has a pore size of $0.1\mu$ to 1 micron and wherein the membrane is hydrophilic.

13. A method of making a membrane comprising:
    (A) dissolving the blend of
        (a) one selected from the group consisting of a polysulphone and a polyether sulphone, and
        (b) a diamine substituted with moieties comprising polyethylene oxide groups, moieties comprising polypropylene oxide groups, or moieties comprising polyethylene oxide groups and polypropylene oxide groups in a first solvent; and (B) co-precipitating the blend.

14. A method as claimed in claim 13 wherein the first solvent is selected from the group consisting of is n-methylpyrrolidone, dimethylformamide and dimethylacetamide.

15. A method as claimed in claim 13 wherein pore modifying agents are added to the solution.

16. A method as claimed in claim 15 wherein the pore modifying agent is selected from the group consisting of water, an alcohol, methanol, ethanol, n-butanol, a polyethylene glycol (PEG), a glycerol, polyvinylpyrrolidones (PVP) and a second solvent.

17. A method as claimed in claim 15 wherein the pore modifying agent is present in an amount of up to 100% of the solvent.

18. A method as claimed in claim 15 wherein the pore modifying agent is polyethylene glycol which is present in an amount up to 80% of the solution.

19. A method as claimed in claim 15 wherein the pore modifying agent is PVP which is present in an amount up to 50% of the solution.

20. A method as claimed in claim 15 wherein the pore modifying agent is butanol which is present in an amount up to 20% of the solution.

21. A method as claimed in claim 15 wherein the pore modifying agent is glycerol which is present in an amount up to 20% of the solution.

22. A method as claimed in claim 15 wherein the pore modifying agent is water which is present in an amount up to 15% of the solution.

23. A method as claimed in claim 13 comprising precipitating the blend using a phase inversion process using a precipitation liquid.

24. A method as claimed in claim 13 further comprising cross-linking before coprecipitation.

25. A method as claimed in 24 comprising washing after cross-linking.

* * * * *

UNITED STATES PATENT AND TRADEMARK OFFICE
CERTIFICATE OF CORRECTION

PATENT NO. : 6,495,043 B1
DATED : December 17, 2002
INVENTOR(S) : Martin Leonard Heijnen It is certified that error appears in the above-identified patent and that said Letters Patent is hereby corrected as shown below:

Title page,
Item [57], ABSTRACT,
Line 3, "plyether" should read -- polyether --

Column 2,
Line 25, (formula (III):

should read

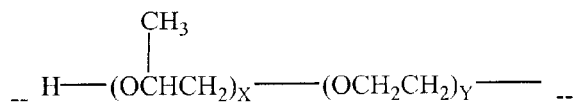

Line 34, "1.650 to 50.000" should read -- 1,650 to 50,000 --
Line 50, "4.230.463" should read -- 4,230,463 --
Line 55, "20.000 to 80.000" should read -- 20,000 to 80,000 --

Column 3,
Line 30, "1.000" should read -- 1,000 --

UNITED STATES PATENT AND TRADEMARK OFFICE
CERTIFICATE OF CORRECTION

PATENT NO.   : 6,495,043 B1
DATED        : December 17, 2002
INVENTOR(S)  : Martin Leonard Heijnen It is certified that error appears in the above-identified patent and that said Letters Patent is hereby corrected as shown below:

<u>Column 6,</u>
Line 23, (formula (III):

$$\text{`` H}\text{---}(\overset{\overset{\displaystyle CH_3}{|}}{O}CH_2CH_2)_X\text{---}(OCH_2CH_2)_Y\text{---''}$$

should read $$\text{-- H}\text{---}(\overset{\overset{\displaystyle CH_3}{|}}{O}CHCH_2)_X\text{---}(OCH_2CH_2)_Y\text{---} \text{--}$$

Signed and Sealed this

Second Day of December, 2003

JAMES E. ROGAN
*Director of the United States Patent and Trademark Office*